(12) United States Patent
Edwards (10) Patent No.: US 10,481,857 B2
(45) Date of Patent: Nov. 19, 2019

(54) DYNAMIC ACOUSTIC CONTROL AND VEHICLE AUDITORY OPTIMIZATION

(71) Applicant: Club Car, LLC, Evans, GA (US)

(72) Inventor: Robert H. Edwards, Martinez, GA (US)

(73) Assignee: Club Car, LLC, Evans, GA (US)

( * ) Notice: Subject to any disclaimer, the term of this patent is extended or adjusted under 35 U.S.C. 154(b) by 0 days.

(21) Appl. No.: 15/799,174

(22) Filed: Oct. 31, 2017

(65) Prior Publication Data
US 2019/0129682 A1    May 2, 2019

(51) Int. Cl.
| | |
|---|---|
| *G06F 3/16* | (2006.01) |
| *H04N 21/258* | (2011.01) |
| *H04N 21/414* | (2011.01) |
| *H04N 21/61* | (2011.01) |
| *H04N 21/6547* | (2011.01) |
| *H04R 3/00* | (2006.01) |

(52) U.S. Cl.
CPC ....... *G06F 3/165* (2013.01); *H04N 21/25808* (2013.01); *H04N 21/25841* (2013.01); *H04N 21/41422* (2013.01); *H04N 21/6125* (2013.01); *H04N 21/6131* (2013.01); *H04N 21/6143* (2013.01); *H04N 21/6547* (2013.01); *H04R 3/00* (2013.01); *H04R 2430/01* (2013.01); *H04R 2499/13* (2013.01)

(58) Field of Classification Search
CPC ... H04R 2499/13; H04R 2430/01; H03G 3/20
USPC .......................................... 381/86, 105, 107
See application file for complete search history.

(56) References Cited

U.S. PATENT DOCUMENTS

| | | |
|---|---|---|
| 4,864,246 A | 9/1989 | Kato et al. |
| 5,081,682 A | 1/1992 | Kato et al. |
| 5,204,971 A | 4/1993 | Takahashi et al. |
| 5,208,866 A | 5/1993 | Kato et al. |
| 5,434,926 A | 7/1995 | Watanabe et al. |

(Continued)

FOREIGN PATENT DOCUMENTS

WO    2017/024351 A1    2/2017

OTHER PUBLICATIONS

European Search Report, European Patent Application No. 18202139.4-1209, dated Dec. 21, 2018, 9 pages.

*Primary Examiner* — Alexander Jamal
(74) *Attorney, Agent, or Firm* — Taft Stettinius & Hollister LLP (57) ABSTRACT

An auditory optimization system that provides a plurality of acoustic arrangements that can specify a plurality of acoustic parameters implementable by respective acoustic control systems of one or more vehicles. The acoustic parameters can be implemented by a controller of the vehicle(s) to control an audio characteristic of a sound emitted through the speaker(s) of the vehicle, such as a volume range, based on the acoustic category associated with the sound. Operation of the system can include the selection of one of the plurality of acoustic arrangements, as well as a selection of the vehicle(s) to receive the acoustic parameter(s) associated with the selected acoustic arrangement. The acoustic parameters of the selected acoustic arrangement can be transmitted via a telematics network to a controller of the identified vehicle(s), which can implement the transmitted acoustic parameters.

20 Claims, 6 Drawing Sheets

(56) References Cited

U.S. PATENT DOCUMENTS

| | | | |
|---|---|---|---|
| 5,483,692 | A | 1/1996 | Person et al. |
| 6,122,617 | A | 9/2000 | Tjaden |
| 6,212,282 | B1 | 4/2001 | Mershon |
| 6,868,162 | B1 | 3/2005 | Jubien et al. |
| 2003/0012389 | A1 | 1/2003 | Brice et al. |
| 2004/0090950 | A1 | 5/2004 | Lauber et al. |
| 2006/0287745 | A1 | 12/2006 | Richenstein et al. |
| 2009/0055091 | A1 | 2/2009 | Hines et al. |
| 2010/0202346 | A1 | 8/2010 | Sitzes et al. |
| 2010/0222939 | A1 | 9/2010 | Namburu et al. |
| 2014/0277828 | A1 | 9/2014 | Bullister et al. |
| 2016/0093216 | A1 | 3/2016 | Lee et al. |
| 2017/0199717 | A1* | 7/2017 | Pierfelice ................ G06F 3/165 |
| 2017/0262908 | A1* | 9/2017 | Wei ........................ G06Q 10/02 |
| 2017/0282821 | A1 | 10/2017 | Zych |
| 2018/0076783 | A1* | 3/2018 | Clary ....................... H03G 3/20 |
| 2018/0173223 | A1* | 6/2018 | Doane ................... B60W 30/08 |
| 2018/0193715 | A1* | 7/2018 | Thompson, Jr. ....... A63B 69/36 |

* cited by examiner

DYNAMIC ACOUSTIC CONTROL AND VEHICLE AUDITORY OPTIMIZATION

BACKGROUND

Embodiments of the present application generally relate to dynamic acoustic control and auditory optimization for vehicles. More particularly, but not exclusively, embodiments of the present application relate to control and optimization of auditory systems for a one or more utility vehicles.

For at least the last several years, the domestic U.S. golf market has generally been in a state of decline. While there can be varied reasons for this decline, one reason can be attributed to a lack of interest in the sport by millennials. Indeed, compared to even a few decades ago, there appears to be less participation in golf among younger generations. This downward trend in golf has also coincided over the last several years with the considerable growth in the interest of younger generations in social media and streaming music.

Given that golf is often viewed as a game of concentration, traditional golfers have often sought to, at least during certain periods of golf play, minimize levels of potential distractions, including minimizing the level or amount of audible sounds. Yet, providing millennials access to streaming music, social media access, and other media services on the golf course in an attempt to attract millennials to the game of golf could result in an increase in the level of noise on the course. Hence, it is an ongoing challenge to reconcile these competing interests, while still providing an enjoyable experience for all current and prospective golf enthusiasts. Accordingly, there is a significant need for the unique and inventive apparatuses, methods, systems and controls disclosed herein.

BRIEF SUMMARY

According to a particular embodiment, a method includes selecting an acoustic arrangement that specifies one or more acoustic parameters for one or more acoustic categories. The acoustic parameters of the selected acoustic arrangement can implementable by an acoustic control system of a vehicle. Further, the one or more acoustic parameters of the selected acoustic arrangement to the acoustic control system can be transmitted, via a telematics network, and received by the acoustic control system of the vehicle. Additionally, the acoustic control system can apply the received one or more acoustic parameters to control one or more characteristics of an audio for the one or more acoustic categories that is emitted from one or more speakers of the vehicle.

According to another embodiment, a non-transitory computer-readable storage medium stores a plurality of acoustic arrangements, each of the plurality of acoustic arrangements specifying at least one acoustic parameter implementable by respective acoustic control systems of one or more of a plurality of vehicles to control one or more acoustic categories. The non-transitory computer-readable storage medium comprises instructions that, when executed by a processor, cause the processor to perform operations including selecting an acoustic arrangement from the plurality of acoustic arrangements and identifying one or more vehicles of the plurality of vehicles that is to receive the at least one acoustic parameter of the selected acoustic arrangement. Additionally, the operations performed by the processor can also include generating an acoustic package operable to update one or more non-transitory computer-readable memory media of respective acoustic control systems of the identified one or more of vehicles with the at least one acoustic parameter of the selected acoustic arrangement. The operations performed by the processor can further include transmitting the acoustic package to the identified one or more of vehicles, the transmission being completed upon receipt by the respective acoustic control systems of the identified one or more vehicles with the at least one acoustic parameter of the selected acoustic arrangement.

According to another embodiment, an auditory optimization system can include a first computer system comprising a non-transitory computer-readable storage medium that stores a plurality of acoustic arrangements that specify a plurality of acoustic parameters implementable by respective acoustic control systems of one or more vehicles to control one or more characteristics of an audio for one or more acoustic categories that is emitted from one or more speakers of the vehicle. The first computer system can also include at least one processor and a program code, the program code being stored on the non-transitory computer-readable storage medium and configured upon execution by the at least one processor to select one of the plurality of acoustic arrangements and an identify the vehicle to receive one or more acoustic parameters of the selected acoustic arrangement. The program code can further generate, in response to the selected acoustic arrangement and the identification of the vehicle, an acoustic package operable to update one or more non-transitory computer-readable storage media of the acoustic control system of the identified vehicle with at least some of the one or more acoustic parameters of the selected acoustic arrangement; and transmit the acoustic package to the identified vehicle.

One advantage of the present disclosure is the flexibility to dynamically and easily select and modify acoustic arrangements of media services and settings that are best suitable of a plurality, or fleet, of vehicles particular requirements and standards. As an example, an operator of a plurality, or fleet, of utility vehicles, (or back-office system), can have the capability to conveniently make real-time acoustic arrangement adjustments based upon factors including: the geographic location of the vehicle(s); the particular time of day; the date; the proximity of the vehicle(s) to another vehicle(s); the type of acoustic category; and/or a combination thereof, among other factors. Accordingly, users of the vehicles can benefit from a customized auditory experience with respect to media services such as, for example: streaming music, streaming video, social media, announcements, audiobooks, podcasts, or other audio. Features and other benefits that characterize embodiments are set forth in the claims annexed hereto and forming a further part hereof. However, for a better understanding of the embodiments, and of the advantages and objectives attained through their use, reference should be made to the Drawings and to the accompanying descriptive matter.

BRIEF DESCRIPTION OF THE DRAWINGS

The description herein makes reference to the accompanying figures wherein like reference numerals refer to like parts throughout the several views.

The foregoing summary, as well as the following detailed description of certain embodiments of the present application, will be better understood when read in conjunction with the appended drawings. For the purpose of illustrating the application, there is shown in the drawings, certain embodiments. It should be understood, however, that the present application is not limited to the arrangements and instrumentalities shown in the attached drawings. Further, like numbers in the respective figures indicate like or comparable parts.

DESCRIPTION OF THE ILLUSTRATED EMBODIMENTS

Figure 1:
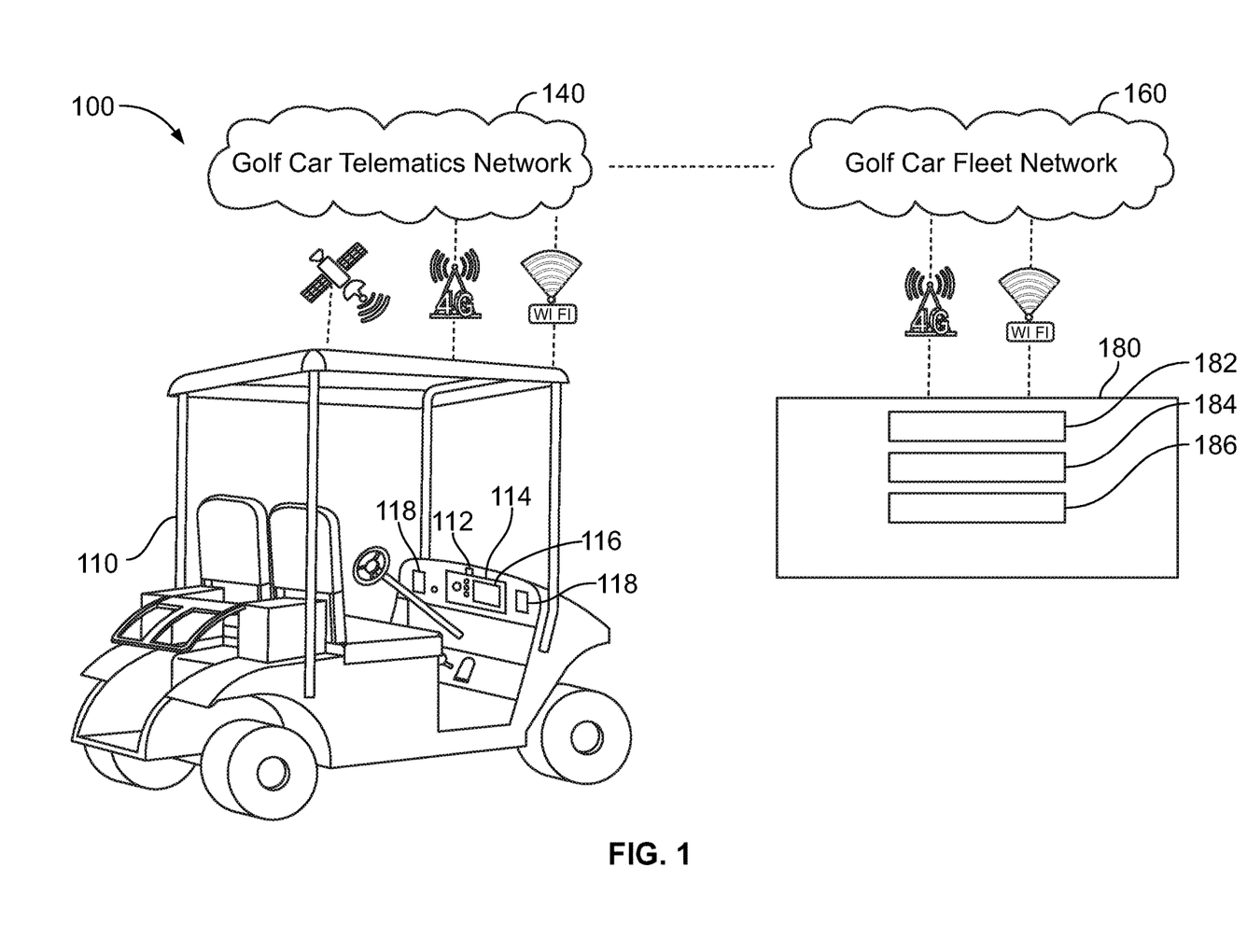
FIG. 1 illustrates a schematic representation of an exemplary auditory optimization system for a utility vehicle according to an illustrated embodiment of the subject application.

FIG. 1 illustrates a schematic representation of an exemplary auditory optimization system 100 according to an embodiment of the subject application. As illustrated, the exemplary auditory optimization system 100 can include a utility vehicle 110, one or more networks 140, 160, and an operator computer system 180. A variety of different types of vehicles can be used as the utility vehicle 110. Further, the utility vehicle 110 can be a motorized vehicle, such as, for example, a vehicle that is motorized or otherwise powered via use of electrical power, batteries, internal combustion engines, renewal energy sources, and/or combinations thereof, in addition to other manners of motorization. Further, the utility vehicle can be adapted for a variety of different types of applications and/or uses. For example, according to certain embodiments, the utility vehicle 110 is a motorized golf car or cart. Alternatively, or additionally, according to other embodiments, the utility vehicle is a fully autonomous vehicle, small all-terrain utility vehicle, a neighborhood vehicle, or any other similarly classed light utility passenger vehicle. Accordingly, it will be understood that descriptions found herein that mention "utility vehicle" are not to be construed as limited, but rather can be applied more broadly as set forth herein.

The utility vehicle 110 can be configured to communicate information externally over the one or more networks 140, 160. As shown in FIG. 1, according to the depicted embodiment, the one or more networks 140, 160 can comprise a telematics network 140 and an operator network 160. In the illustrated embodiment, the telematics network 140 and the operator network 160 can be geographically remote from one another and can be accessed, controlled, and/or managed by different network administration authorities. Further, the telematics network 140 can be a subscriber accessible network, such as, for example, a cellular communication network that provides wireless communication capability over a geographic region. Further, the operator network 160 can comprise one or more networks managed and/or administered by a system operator, including, for example, but not limited to, an owner of the utility vehicle 110 and/or a plurality of utility vehicles. Thus, according to the embodiment depicted in FIG. 1 in which the utility vehicle 110 is a golf car, the telematics network 140 can be referred to as a golf car vehicle telematics network, and the second network can be referred to as a golf car fleet network.

As indicated by FIG. 1, the telematics and operator networks 140, 160 can each include, or be in operable communication with, one or more computer networks, such as, for example, a local area network (LAN) including wireless LAN (i.e., Wi-Fi), a wide area network (WAN), a cellular network (e.g., 3G, 4G Long-Term Evolution (LTE), 5G, etc.), and/or the Internet, among other networks that are configured to send and/or receive data. Additionally, as shown in FIG. 1, the operator computer system 180 can be connected to the operator network 160. Further, according to certain embodiments, the operator computer system 180 can be a fleet operator computer system, as discussed below.

In the exemplary embodiment illustrated in FIG. 1, the utility vehicle 110 can include, or have operably coupled thereto, a navigation and positioning system (NPS) 112, which can also be referred to as a telematics system and/or a respective telematics system(s). For example, according to certain embodiments, the NPS 112 is a global position system (GPS) device that is mounted external to the utility vehicle 110, and/or an electronic horizon device that is connected to the utility vehicle 110. According to such embodiments, the NPS 112 can be electronically connected to an electronic acoustic control system (i.e., a controller) 114 for the purpose of providing, and/or receiving information, including, for example, geographic location data of a golf course, future route information, and/or forecast information, among other information. Further, according to certain embodiments, other additional information can be can be transmitted to/from the NPS 112 and the controller 114, such as, for example, information pertaining to the utility vehicle's 110 proximity to other utility vehicles and/or weather forecasts. It is also contemplated that in certain embodiments, such as embodiments in which the NPS 112 is not connected to the controller 114, route information can be programmed into a memory that can be accessed by the controller 114 while the utility vehicle 110 is travelling. For example, according to embodiments in which the utility vehicle 110 is a golf car, such information can be accessible to the controller 114 as the utility vehicle 110 is traveling along a golf course travel route.

In the illustrated embodiment of FIG. 1, the controller 114 can also be connected to a display 116 and one or more audio speakers 118. In certain embodiments, the display 116 can be a visual display computer unit (VDCU) (e.g., a monitor, a liquid crystal display (LCD) panel, organic light emitting diode (OLED) display panel, among others) such as a touch screen interactive display with streaming music and social media connectivity and capabilities. The VDCU can display a variety of information, including, for example, information that is updated in real-time regarding the current location and/or path of travel of the utility vehicle 110 as well as information pertaining to other utility vehicles. For example, according to embodiments in which the utility vehicle 110 is a golf car, or otherwise used in a golf setting, the VDCU can display, and update in real time, at least a portion of the golf course map indicating the location and/or path of travel of the utility vehicle 110, as well as an indication of the proximity of the utility vehicle 110 to other utility vehicles or golf cars. Additionally, according to certain embodiments, the utility vehicle 110 can further include a network interface(s) that can include a wireless interface compatible with Institute of Electrical and Electronics Engineers (IEEE) 802.11 (e.g., Wi-Fi) protocol, or other wireless interfaces.

To interface with the telematics and operator networks 140, 160, the system operator, such as, for example, a system operator of a plurality of golf cars, can utilize an internet-enabled operator computer system 180, such as, for example, a laptop, mobile device, tablet, portable media player, and/or wearable electronic device, among other computer systems. Moreover, the system operators can utilize a user interface (I/F) of the operator computer system 180, such as, for example, one or more user input devices (e.g., a keyboard, a mouse, a touchpad, and/or a microphone, among others), as well as utilize a display (e.g., a monitor, a liquid crystal display (LCD) panel, light emitting diode (LED) display panel), and/or a speaker, among other user interface (I/F) and/or input/output (I/O) devices. In other examples, user input can be received via another computer system or terminal. Further, according to certain embodiments, the operator computer system 180 can also include a central processing unit (CPU) 182 including at least one hardware-based processor coupled to a memory 184.

The memory 184 can represent random access memory (RAM) devices of main storage of the operator computer system 180, supplemental levels of memory (e.g., cache memories, non-volatile or backup memories (e.g., programmable or flash memories)), read-only memories, or combinations thereof. In addition to the memory 184, the operator computer system 180 can include other memory located elsewhere in the operator computer system 180, such as cache memory in the CPU 182, as well as any storage capacity used as a virtual memory (e.g., as stored on a storage device or on another computer coupled to the operator computer system 180). The memory 184 can include one or more databases to store data, including data related to fleet setting controls of a collection of one or more utility vehicles 110, geo-fence setup and geographic data, acoustic parameter data, etc. The operator computer system 180 can operate under the control of an operating system, and can execute or otherwise rely upon various computer software applications, components, programs, objects, modules, data structures, etc. (such as, for example, software related to fleet setting control and geo-fence setup). Moreover, various applications, components, programs, objects, modules, etc. can also execute on one or more processors in another computer coupled to the operator computer system 180 via the operator network 160 or other web-server network (e.g., in a distributed or client-server computing environment) where the processing to implement the functions of a computer program can be allocated to multiple resource computers over the operator network 160 or other web-server network.

Furthermore, the operator computer system 180 can include one or more network interfaces 186 which can be connected to the telematics and operator networks 140, 160, or other web-server networks, to enable communication of information with other computers and electronic devices. According to certain embodiments, the network interface(s) 186 can be wired and/or wireless interfaces that enable the operator computer system 180 to communicate data via a network, such as the Internet. For example, the network interface(s) 186 can include an Ethernet interface, a wireless interface compatible with an Institute of Electrical and Electronics Engineers (IEEE) 802.11 (e.g., Wi-Fi) protocol, or other wired or wireless interfaces.

In the illustrated embodiment, from the operator computer system 180, the operator network 160 can send data to, and receive data from, the telematics network 140. Additionally, the telematics network 140 can send and receive data to/from the NPS 112 of the utility vehicle 110. Accordingly, the utility vehicle 110 can interface with each of the telematics network 140 and the operator network 160. Additionally, in at least certain implementations, as discussed below, the operator network 160 can select between one or more acoustic arrangements, and moreover, a plurality of acoustic arrangements, that are stored in computer systems (e.g., non-transitory computer-readable storage/memory media, including, but not limited to, stored in the operator computer system 180) that is accessible by the operator network 160, and which can be implementable via the telematics network 140 for the utility vehicle 110. Moreover, the selectable acoustic arrangements can be implemented via the controller 114 of the utility vehicle 110 to at least reproduce audio sounds through the one or more audio speakers 118 of the utility vehicle 110.

According to certain embodiments, the acoustic arrangements can comprise one or more acoustic parameters that can control the characteristics or properties, or other settings, of the audio that is, or can be, emitted from the speakers 118 of the utility vehicle 110. Moreover, the selectable acoustic arrangements can, for example, be based on one or more acoustic parameters, such as, for example, allowable volume, bass, and/or treble levels, ranges, and/or limits, for audio that is, or will be, emitted through the speakers 118. Thus, according to certain embodiments, the acoustic arrangements can include one or more differences and/or variations in the associated acoustic parameters for at least some of the audio that can be emitted through the speakers 118 of the utility vehicle 110.

The acoustic parameters for each of the acoustic arrangements can based on a variety of considerations. For example, according to certain embodiments, one or more acoustic parameters of an acoustic arrangement can provide audio settings, such as, for example, volume limits, based on a type, category, and/or source of audio, referred to herein as acoustic category, that is, or will be, emitted by the speaker 118. For example, according to certain embodiments, the acoustic arrangement can include acoustic parameters for one or more of the following acoustic categories: streaming video, streaming music, social media, podcasts, audiobooks, and operator announcements, among other types of acoustic categories that may provide sound through, or otherwise be emitted using, the speakers 118. Additionally, or alternatively, the acoustic categories can be based on the source that provides the audio that will be emitted through the speakers 118, such as, for example, based on the audio being provided by an on-line provider, the operator or manager of the utility vehicle 110, and/or a device provided by the user of the utility vehicle 110. For example, according to certain embodiments, the acoustic categories to which the acoustic arrangements can provide acoustic parameters can include one or more of the following: internet-provided or intranet-provided streaming music (e.g., Spotify™, Pandora™, Apple Music™, Google Play Music™, radio, etc.), internet-provided or intranet-provided streaming video (e.g., YouTube™, etc.), announcements (e.g., golf course specific announcements for various holes on the golf course such as: an announcement to order food at a particular hole, an announcement regarding current or future weather conditions, or an announcement regarding the golf course itself (e.g., "steep hill ahead" or "keep away from the green"), social media content or entertainment streams (e.g., Facebook™, Instagram™, Snapchat™, various messaging apps, etc.).

Further, the acoustic parameters within an acoustic arrangement can be different for different acoustic categories, as well as have one or more differences with the acoustic parameters for similar acoustic categories in other acoustic arrangements. For example, according to certain embodiments, a first one of the selectable acoustic arrangements can include, among other acoustic parameters, at least acoustic parameters that provide a first volume limit for streaming music that is, or will be, to be emitted from the speakers 118 (as measured, for example, in decibels (dB) or a percentage of the maximum volume limit,) and acoustic parameters that provide a second volume limit for operator announcements that can be emitted through the speakers 118, the second volume limit level being different than the first volume level limit. Further, for example, another selectable acoustic arrangement could include, among other acoustic parameters, at least the acoustic parameters that set third and fourth volume limits for streaming music and operator announcements, respectively, third and fourth volume level limits being different than at least one of the first and second volume limits.

Additionally, for example, according to certain embodiments, a first selectable acoustic arrangement may provide acoustic parameters at which operator announcements have a volume setting of 100%, and the acoustic parameters for social media content, streaming music, or other audio is set at a volume setting of 50%. Alternatively, a second selectable acoustic arrangement can have an acoustic parameter for operator announcements set at a volume setting of 100%, acoustic parameters for podcasts, audiobooks, and social media content set to a volume setting of 75%, and acoustic parameters for streaming music set at a volume setting of 50%. Further, a third selectable acoustic setting can have acoustic parameters for operator announcements set at a volume setting of 100%, acoustic parameters for soft streaming music (e.g., classical music), podcasts, audiobooks, acoustic parameters for social media content set to a volume setting of 75%; and acoustic parameters for relatively loud streaming music (e.g., rock music) set at a volume setting of 50%.

The acoustic parameters in the acoustic arrangements can also provide audio settings for other acoustic configurations that may, or may not, cause adjustments in at least some of the acoustic parameters associated with the above-discussed acoustic categories. Depending on the type of acoustic configuration, the type of changes or adjustments caused by the acoustic configuration may, or may not, be temporary during at least a certain usage period of the utility vehicle 110.

Further, the settings associated with an acoustic configuration(s) can, when the acoustic configuration(s) is invoked, take priority over the parameters associated with the acoustic categories. Moreover, according to certain embodiments, the acoustic configurations can be configured to adjust the acoustic parameters for some, but not all, of the acoustic categories. For example, according to certain embodiments, the acoustic configuration can be configured to cause certain adjustments in the volume for certain acoustic categories, such as music based categories, upon the satisfaction of a condition, but not adjust the acoustic parameters of other acoustic categories, such as, for example, operator announcements. Further, the degree to which the acoustic conditions adjust, if at all, acoustic parameters may, or may not, be different for different acoustic categories.

For example, according to certain embodiments, the acoustic configurations can include timed audio settings, which can relate to the timing, including, for example, the time of day, week, and/or month, that audio of an acoustic category can be emitted, and/or the permissible volume limit the acoustic category can be emitted, through the audio speakers 118. Thus, for example, if streaming music is being played at a volume as set by the acoustic parameter for the associated acoustic category, the acoustic configuration can be configured to change the permissible volume level for that acoustic category at a certain time of day. Thus, for example, the timed audio settings can be configured to reduce the volume at which streaming music can be played through the speakers 118 during at least certain morning and/or evening hours.

Additionally, according to certain embodiments, the acoustic configurations can include geo-fencing, which can relate to the location of the utility vehicle 110, the environment in which the utility vehicle 110 is currently located, and/or the proximity of the utility vehicle 110 to other utility vehicles. Similar to the above-discussed timed audio settings, the geo-fencing can facilitate a change in acoustic parameters, such as, for example, volume limits, in an acoustic arrangement for one or more, but not necessarily all, acoustic categories. Thus, for example, according to certain embodiments, when a utility vehicle 110 is in relatively close proximity to a particular location, such as, for example, a tee box or putting green on a golf course, or in relatively close proximity to another utility vehicle 110, the geo-fencing acoustic configuration can facilitate a change in the volume of audio being emitted, if at all, through the speakers 118. Further, such geo-fencing features can be used in connection with the previously discussed NPS 112.

Other acoustic configurations can be configured to maintain a degree of uniformity in at least certain audio settings for a plurality of utility vehicles 110. For example, according to certain embodiments, the acoustic configurations can include a fleet master volume that can be a particular volume setting or level that can be established for each of a plurality, or fleet, of utility vehicles at a particular time. Moreover, according to certain embodiments, the fleet master volume can establish a volume limit, such as, for example, a maximum percentage of a volume setting for each acoustic parameter for each acoustic category at which sounds can be emitted through the speakers 118. Similarly, the acoustic configurations can include a fleet volume mute, which can, for example, at a particular time reduce a volume level setting of a plurality, or fleet, of utility vehicles 110, including reducing the volume settings such that little or no noise is to be emitted through the speakers 118.

According to certain embodiments, the acoustic arrangements can be pre-set or predetermined configurations of one or more acoustic parameters for various acoustic categories and/or acoustic configurations, as well as variations in one or more settings of those acoustic parameters. For example, according to certain embodiments, predefined or predetermined acoustic arrangements can be stored in web server computer systems either affiliated or unaffiliated with the operator and/or owner of the operator network 160. Thus, according to such embodiments, the selection of the acoustic arrangement, and the associated one or more acoustic parameters and corresponding settings, can be implementable via the telematics network 140 for the controller 114 of the utility vehicle 110.

Alternatively, or additionally, the operator network 160 can also generate and/or define customized acoustic arrangements, and/or adjust or alter existing acoustic arrangements. For example, according to certain embodiments, a back-office computer system can be operable to reprogram and/or modify one or more calibratible acoustic parameters of one or more acoustic arrangements, such as, for example, adjust the configuration of one or more acoustic configurations and/or modify an audio setting for one or more acoustic categories. For example, according to certain embodiments, a back-office computer system, among other systems, can access a remotely accessible web portal, which may be maintained by the operator via a second computer system connected to the Internet, to create a customized acoustic arrangement(s) via the selection of one or more acoustic parameters from a plurality of acoustic parameters, and/or one or more acoustic categories, for an acoustic arrangement(s). Additionally, or alternatively, the operator can create, or further define, a customized acoustic arrangement(s) via adjusting of the associated setting(s) for one or more of the acoustic parameters of an acoustic arrangement(s).

In an example operation, an operator, such as, for example, an owner or manager of a plurality, or fleet, of utility vehicles, or a back-office computer system, can assign a desired acoustic arrangement for at least one selected utility vehicle 110, but not necessarily all utility vehicles, in the plurality or fleet of utility vehicles. Such selection, or generation, of a particular acoustic arrangement(s) can be based on a variety of different predetermined factors, as well as a combination of predetermined factors that may or may not be directly associated with the at least one selected utility vehicle 110. For example, according to certain embodiments, the owner or manager may at least initially select, or customize, an acoustic arrangement for one or more utility vehicles 110 based, on for example, the actual or anticipated preferences of the driver or user(s) of the utility vehicle 110, the anticipated manner or environment of use of the utility vehicle 110, the particular time of day, the date, the current or anticipated proximity of the selected utility vehicle(s) 110 to other utility vehicles, and/or a combination thereof, among other factors.

Customized acoustic arrangements, as well as at least logic design associated with the acoustic arrangements, can be stored in one or more storage devices or memory of one or more computer systems, such as, for example, the operator computer system 180 in the fleet operator network 160. Various golf fleet setting control and geo-fence set up software can also be stored in one or more storage devices of one or more computer systems in the operator network 160. Accordingly, in certain embodiments, an operator (or a back-office computer system itself in certain implementations) can control acoustic arrangements for one or more utility vehicles 110 of plurality, or fleet, of utility vehicles. Similarly, a fleet operator can control acoustic arrangements of one or more groupings or fleets of utility vehicles such that the acoustic arrangements of a fleet of utility vehicles and be selectively different than the acoustic arrangements of at least another fleet of utility vehicles.

For example, according to certain embodiments, the utility vehicle 100 can be one of a plurality, or fleet, of golf cars within a golf course. Further, the operator may have other fleets of golf cars on other golf courses. In such a situation, for example, the fleet operator (or the back-office computer system itself in certain implementations) could utilize the auditory optimization system 100 disclosed herein to control acoustic arrangements for the multiple golf car fleets on the different golf courses. However, such implementation of the auditory optimization system 100, as disclosed herein, is may be used with a variety of other types, and numbers, of utility vehicles 110, as well in connection with other environments and/or uses, such as, for example, resorts, beaches, forest preserves, parks, or private property, among others.

Advantageously, an operator of a utility vehicle 110, and/or of a plurality, or fleet, of utility vehicles 110, can be afforded the flexibility to dynamically and relatively easily select and modify acoustic arrangements for acoustic categories and acoustic configurations in a manner that may be best suitable fleet's particular requirements and standards. Further, the operator (or fleet back-office system) can have the capability to conveniently make real-time acoustic arrangement adjustments based upon factors including, for example, the geographic location of the utility vehicle 100, the particular time of day, the date, the proximity to other utility vehicles, acoustic category, and/or a combination thereof, among other factors. Thus, in at least certain applications, such as, for example, in situations in which the utility vehicle 110 is a golf car used for golfing, experienced and prospective golfers can benefit from a customized auditory golf experience with respect to media services such as: streaming music, social media, streaming video, announcements, audiobooks, podcasts, or other audio.

Figure 2:
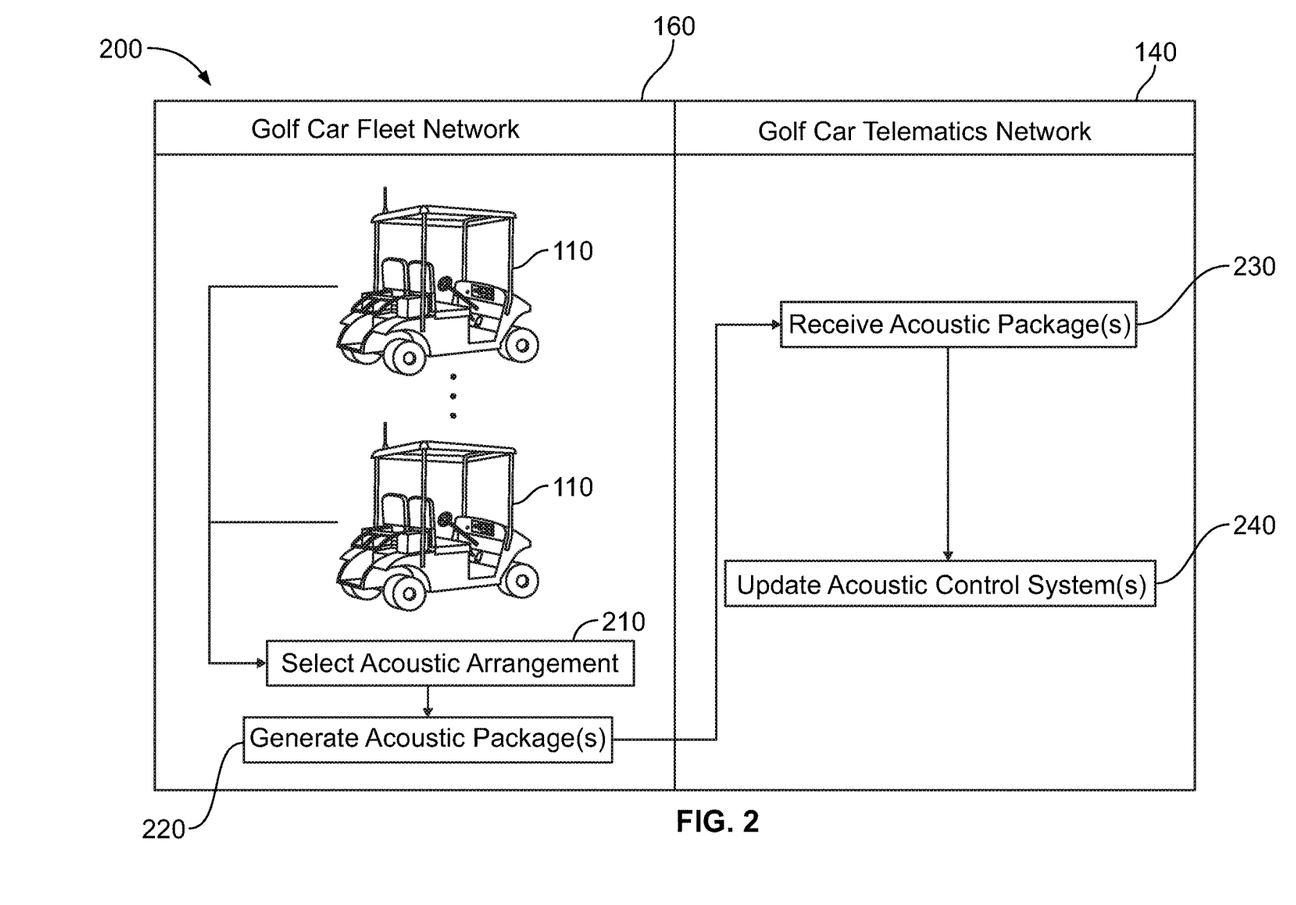
FIG. 2 illustrates a schematic representation of certain aspects of an exemplary process executable by, or in connection with, the exemplary auditory optimization system depicted in FIG. 1.

With reference to FIG. 2, there is illustrated a flow diagram illustrating certain aspects of an exemplary process 200 which can be performed by the auditory optimization system 100. The operations illustrated for all of the processes in the present application are understood to be examples only, and operations may be combined or divided, and added or removed, as well as re-ordered in whole or in part, unless explicitly stated to the contrary. As shown, at the operator network 160, one or more utility vehicles 110 of a plurality, or fleet, of utility vehicles are assigned to travel through a particular location. For example, according to certain embodiments, the utility vehicle 110 can be one or more golf cars of a plurality, or fleet, of golf cars that are to travel through a golf course. As previously discussed, according to certain embodiments, a selected acoustic arrangement, which can, again, be pre-determined or customized, can be implementable by the controller 114 of the utility vehicle 110 to specify one or more acoustic parameters to control the audio emitted from the speakers 118 from one or more acoustic categories.

At operation 210, an operator utilizing the operator computer system 180 (or a fleet back-office system) connected to the operator network 160, can select from a plurality of acoustic arrangements an acoustic arrangement, or otherwise create a customized acoustic arrangement, for an implementation by the controller 114 of the utility vehicle 110. According to certain embodiments, such a selection or creation of the acoustic arrangement can involve the use of an acoustic arrangement selection menu (i.e., selection menu). In a particular implementation, the selection menu is presented on one or more selection screens, as illustrated, for example, by FIGS. 3-7. In certain embodiments, data associated with a plurality of acoustic arrangements is stored in one or more databases of the operator computer system 180 in the operator network 160. In alternative embodiments, information/data associated with a plurality of acoustic arrangements is stored in one or more databases in a computer system/server unaffiliated with the operator network 160.

From operation 210, in the operator network 160, upon selecting or creating a particular acoustic arrangement, the information/data associated with the acoustic arrangement can be updated in the one or more databases of the operator computer system 180. Based on the updated data, at operation 220, in the operator network 160, a software package(s) (i.e., acoustic package(s)) can be written that includes the one or more acoustic parameters associated with the acoustic arrangement, and which are generated and operable to update the one or more corresponding acoustic parameters currently being implemented by, or otherwise in, the controller(s) 114 of the utility vehicle(s) 110.

Next, the operator network 160 can transmit the respective acoustic package(s) to one or more respective telematics system(s) 112 via the telematics network 140. At operation 230, the acoustic package(s), including the one or more acoustic parameters associated with the selected or customized acoustic arrangement, can be received with one or more respective telematics system(s) 112 in the telematics network 140, and then subsequently sent to the respective controller(s) 114 of the utility vehicle(s) 110. At operation 240, the acoustic parameters of the acoustic arrangement can be applied to update, if updating is needed, one or more non-transitory computer-readable storage/memory media of the respective controller(s) 114 to control one or more acoustic categories that may be utilized to emit sound through the speakers 118 of the utility vehicle(s) 110.

Figure 3:
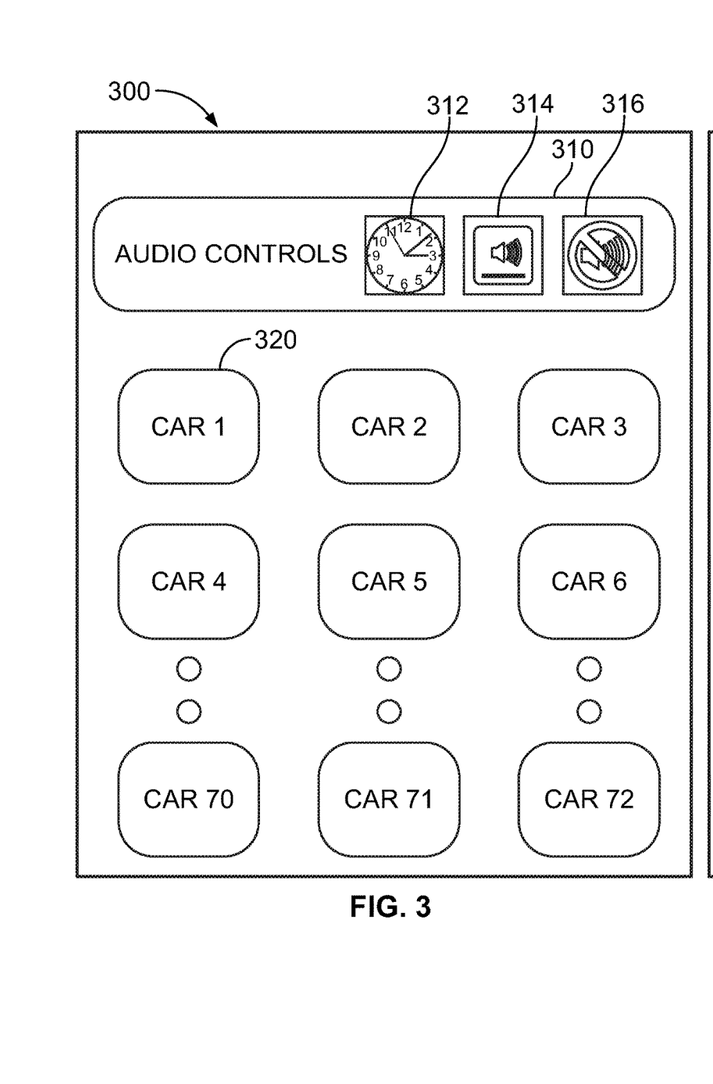
FIG. 3 illustrates an exemplary display of at least a portion graphical user interface of an operator computer system for controlling at least certain aspects of an exemplary auditory optimization system.

FIG. 3 illustrates a representation of a display 300, such as, for example, screenshot depicting certain aspects a graphical user interface (GUI) touch display, of the operator computer system 180. In certain embodiments, the display 300 can display an audio control web page or web portal that can, for example, be stored on an Internet web server, and which can be accessible through the operator network 160. In an implementation, the display 300 includes an audio control panel 310 that displays one or more selectable interactive touch display icons (i.e., "buttons"), and which can be used in connection with selecting, modifying, and/or setting one or more acoustic parameters and/or creating a customized acoustic arrangement. For example, according to the illustrated embodiment, the one or more buttons on the audio control panel 310 include buttons 312, 314, 316 for one or more of the above-discussed acoustic configurations, such as, for example, fleet-timed volume settings, fleet master volume, and fleet volume mute. Alternatively, or additionally, the buttons on the audio control panel 310 can be associated with one or more of the above-discussed acoustic categories, such as, for example: social media or entertainment, streaming music, streaming video, audiobooks, podcasts, and/or operator announcements, among other acoustic categories.

The display 300 can also include buttons 320 corresponding to one or utility vehicles 110. Moreover, while FIG. 3 depicts buttons 320 utilized to select an individual utility vehicle 110, according to other embodiments, one or more of the buttons 320 may correspond to a plurality, or one or more groups, of utility vehicles 110. Additionally, the buttons 320 may be selected by the operator in connection with identifying or designations which utility vehicle(s) 110 are to receive, or are to otherwise implement, the previously discussed acoustic package(s). According to embodiments in which the display 300 is a GUI touch screen, such selection can comprise pressing a portion of the display 300 associated with the button corresponding to the selected utility vehicle(s) 110.

Figure 4:
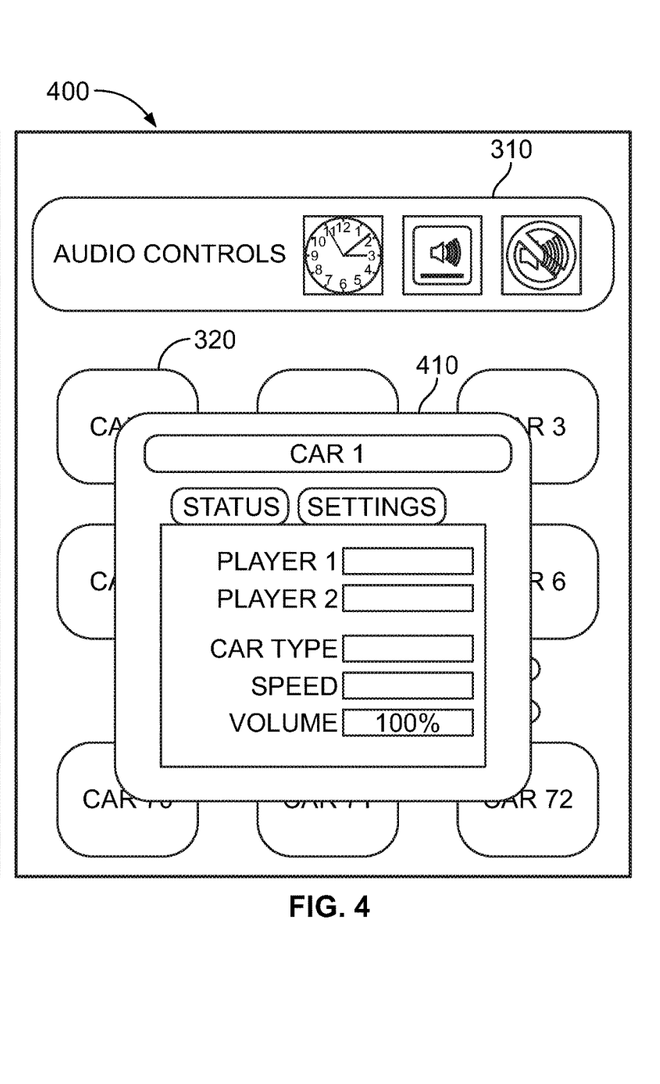
FIG. 4 illustrates certain aspects of the display depicted in FIG. 3, and further includes an on-screen window display illustrating various options and settings for a selected utility vehicle.

With reference to FIG. 4, there is illustrated a diagram illustrating certain aspects of the display 300 of the operator computer system 180. In certain embodiments, when a button 320 associated with a utility vehicle(s) 110 is selected, a display window 410 can appear on-screen illustrating various options and settings for the selected utility vehicle(s) 110. As an example, one option is the control selection of an acoustic parameter, such as, for example, a volume setting associated with one or more acoustic categories and/or acoustic configurations for the selected utility vehicle(s) 110. For example, as discussed in below paragraphs, the acoustic parameter presented in the display window 410 can be associated with one or more acoustic configurations, such as, for example, a fleet master volume setting, a fleet-timed volume setting, or a fleet volume mute setting, among other acoustic configurations.

Figure 5:
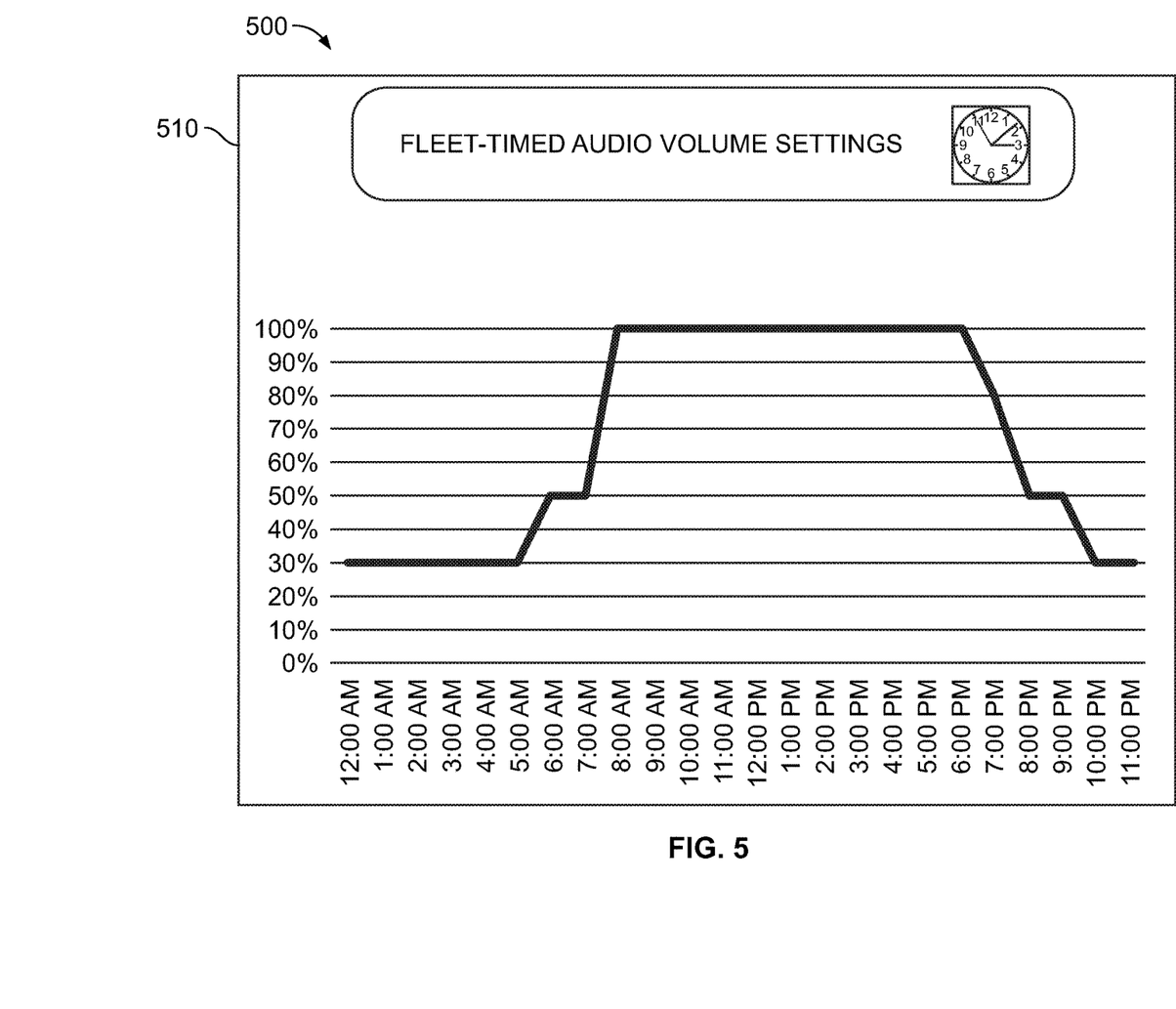
FIG. 5 illustrates a diagram depicting certain aspects of an exemplary fleet-timed volume setting display of an operator computer system.

With reference to FIG. 5, there is illustrated a diagram depicting certain aspects of an exemplary fleet-timed volume setting display, or fleet-timed audio volume settings, 500 of the operator computer system 180. In a particular implementation, when the button 312 for fleet-timed volume settings (e.g., as depicted in FIG. 3) is pressed or otherwise activated, the exemplary fleet-timed volume setting display 500 can appear on-screen illustrating fleet timed volume setting shown on a graph of volume percentage as a function of the time of day. According to certain embodiments, the fleet-timed audio volume settings can be implemented automatically, such as, for example, as part of an acoustic configuration having corresponding acoustic parameters that are communicated to, and implemented by, the controller 114 of the utility vehicle 110. Alternatively, according to certain embodiments, such a fleet timed volume setting can be manually implemented, such as, for example, via operation of the operator computer system 180 by an operator.

According to the example provided by FIG. 5, between 12:00 AM and 5:00 AM, the fleet-timed volume setting(s) can be invoked in a manner that can cause the utility vehicle(s) 110 that are implementing this fleet timed volume setting to operate at a volume level that is 30% of the permissible volume limit set by other acoustic parameters, such as, for example the permissible volume limit indicated by the acoustic parameter associated with each particular acoustic category. Thus, for example, if the acoustic parameter(s) for the acoustic category associated with streaming music that is currently being implemented by the controller 114 has a 70% volume setting, then from between 12:00 AM and 5:00 AM, the depicted fleet timed volume setting would reduce to the volume limit for that particular acoustic category, namely streaming music, to 30% of that 70% volume limit. As another example, between around 8:00 AM and around 6:00 PM, the fleet-timed volume setting is set to 100% volume, such that, during that time, the fleet-timed volume setting is configured to not cause a reduction or increase in the volume limits of the acoustic parameters being implemented by the controller 114. However, as further shown by the example in FIG. 5, after around 6:00 PM to about 10:00 PM, with one exception, the fleet-timed volume setting is configured to cause a generally gradual decrease in the volume limits of the acoustic parameters being implemented by the controller 114.

Figure 6:
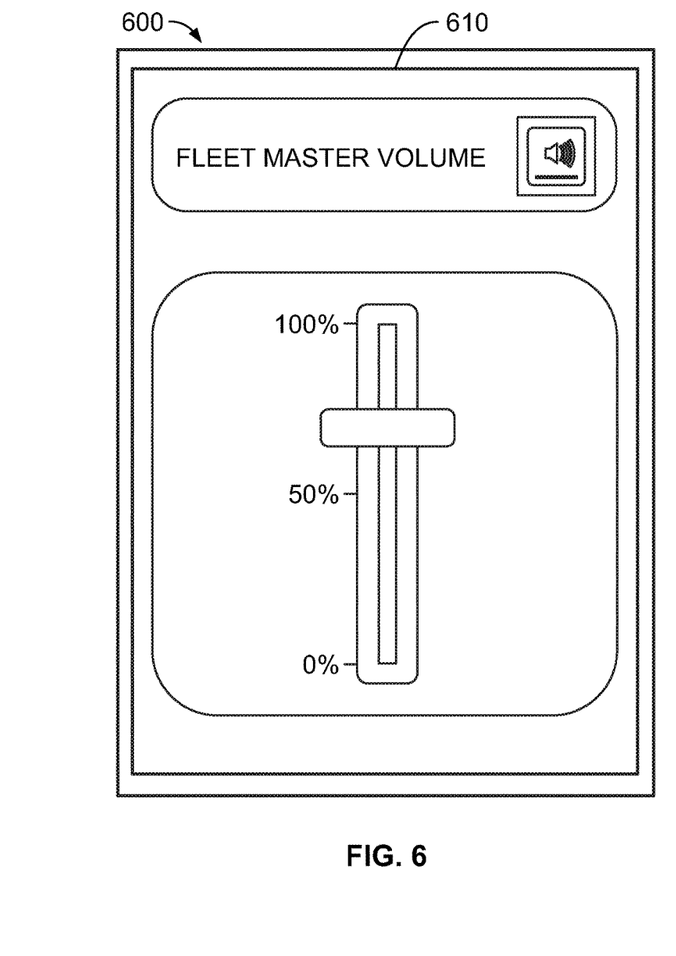
FIG. 6 illustrates a diagram depicting certain aspects of an exemplary fleet master volume display of an operator computer system.

With reference to FIG. 6, there is illustrated a diagram depicting certain aspects of an example fleet master volume display 600 of the operator computer system 180. In a particular implementation, when the button 314 for fleet master volume on the audio control panel 310 (e.g., as depicted in FIG. 3) is pressed or otherwise activated, the example fleet master volume display 600 can appear on the display 300. As shown by FIG. 6, according to the exemplary fleet master volume display 600, the fleet master volume settings can be depicted in the fleet master volume display 600 as a selectable volume control "dimmer" switch. As depicted, a selection bar can be selected and moved "up" and "down" vertically by an operator to control a volume setting for an entire golf car fleet. However, the exemplary fleet master volume, as well as the fleet master volume display 600, can be depicted on the display 300 in a variety of other manners.

Figure 7:
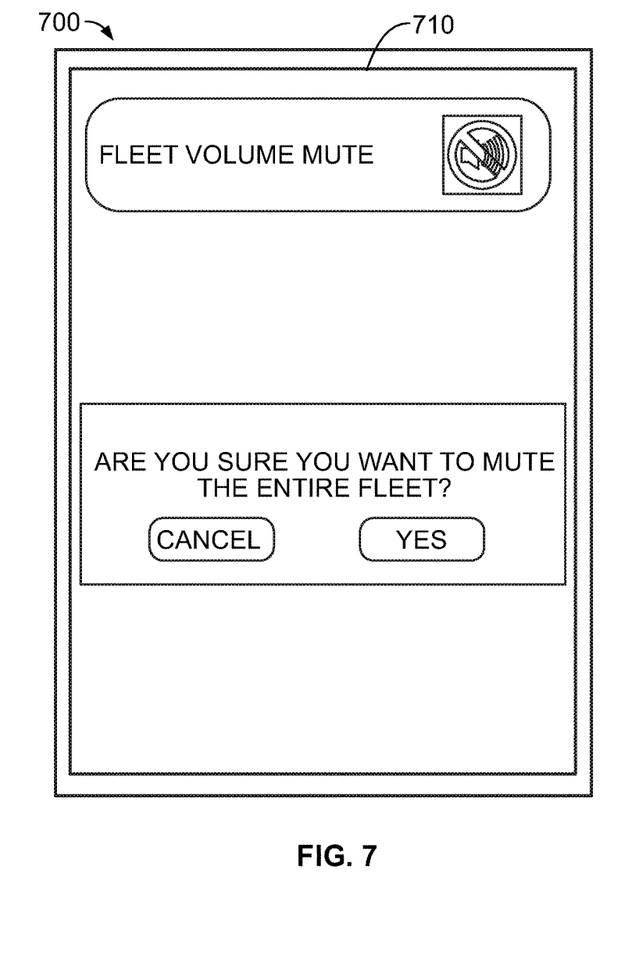
FIG. 7 illustrates a diagram depicting certain aspects of an exemplary fleet volume mute settings display of an operator computer system.

With reference to FIG. 7, there is illustrated a diagram depicting certain aspects of an example fleet volume mute settings display 700 of the operator computer system 180. As previously discussed, according to certain embodiments of the subject application, fleet volume mute settings can relate to reducing a volume level setting of a plurality, or fleet, of utility vehicles 110, including reducing the volume settings such that little or no noise is to be emitted through the speakers 118. Additionally, in a particular implementation, when the button 316 for fleet volume mute is pressed, the example fleet volume mute settings display 700 appears on-screen and can include a "pop up" notification or window seeking confirmation as to whether the operator indeed wants to mute the entire fleet, or plurality, of the utility vehicles 110. In response to the notification, the operator can select one of the selectable icons, e.g., "Cancel" or "Yes." In some examples, if the operator selects "Yes," a second notification can "pop up" with various selectable icons to determine how long the operator would like the entire fleet to be muted. In other examples, if the operator selects "Yes," the screen or display is directed to the fleet-timed audio volume settings display 500, which can indicate that at least at that time the fleet-timed audio volume is set, for example, to at or around a 0% volume level.

While the operation of the fleet volume mute settings are described in connection with FIG. 7 in terms of manually being invoked by the operator of the computer operator system 108, according to other embodiments, the fleet volume mute settings can be implemented automatically, such as, for example, as part of an acoustic configuration having corresponding acoustic parameters that are communicated to, and implemented by, the controller 114 of the utility vehicle 110.

In certain embodiments, buttons associated with other acoustic parameters, such as, for example, volume settings for geo-fence settings, can be included on the audio control panel 310. In an example implementation, pressing or otherwise activating such a button can facilitate an on-screen display on the operator computer system 180. For example, according to certain embodiments in which the utility vehicle 110 is a golf car, the pressing or otherwise activation of a button on the audio control panel 310 associated with geo-fence settings can result in the display of a map of the associated golf course. In an example, the operator can be able to use a computer mouse or his/her finger to establish a boundary, or geo-fence, for a particular acoustic arrangement. The associated acoustic parameters for the geo-fence settings can thus be invoked, for example, by the utility vehicle 110 staying within, or straying outside of, the established geo-fence, as determined in part through use of the NPS 112.

Figure 8:
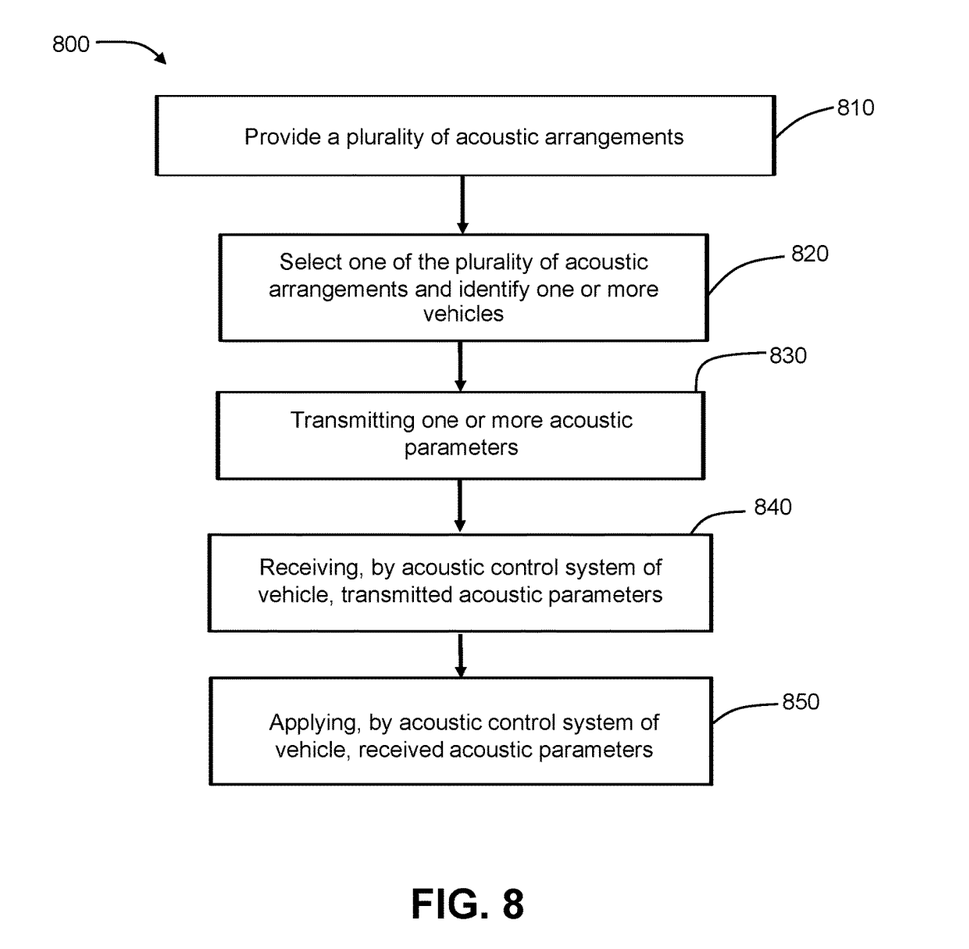
FIG. 8 illustrates a flowchart depicting an exemplary method for dynamic acoustic control and auditory optimization system.

With reference to FIG. 8 there is illustrated a flowchart of a method 800 for dynamic acoustic control and auditory optimization system 100. In an illustrative implementation, the method 800 is performed by the auditory optimization system 100 discussed above with respect to at least FIG. 1.

The method 800 can include, at step 810, providing a plurality of acoustic arrangements for selection. As previously discussed, each of the provided plurality of acoustic arrangements can specify a plurality of acoustic parameters implementable by respective acoustic control systems of one or more utility vehicles 110. Moreover, the acoustic parameters can provide one or more audible settings, ranges, or limits for one or more acoustic categories that may be used control at least certain characteristic or properties of the sound(s) emit from the speaker(s) 118 of one or more utility vehicle(s) 110. Further, the acoustic arrangements can also include a plurality of acoustic parameters for one or more acoustic configurations, which can, when invoked, override, alter, or otherwise adjust the acoustic parameters for the acoustic categories.

Additionally, as described above, pre-determined and/or customized acoustic arrangements can be stored in one or more storage devices or memory devices of one or more computer systems, as the operator computer system 180, among other possible networks, including, for example, networks in operator network 160. Also, each of the acoustic arrangements can specify a plurality of acoustic parameters that are implementable by the controller(s) 114 to control one or more acoustic categories of the utility vehicle(s) 110.

The method 800 can also include, at step 820, selecting one of the plurality of acoustic arrangements, as well as identifying one or more of the utility vehicles 110 of a plurality, or fleet, of utility vehicles to receive the selected acoustic arrangements. For example, as described above with reference to at least FIGS. 2-6, an operator, utilizing the operator computer system 180 (or back-office system) connected to the operator network 160, can select an acoustic arrangement from a plurality of acoustic arrangements for the utility vehicle(s) 110 from an acoustic arrangement selection menu (i.e., selection menu). Alternatively, as previously discussed, the operator, utilizing the operator computer system 180 (or back-office system) can generate or otherwise create a customized acoustic arrangement. In a particular implementation, the selection menu is presented on one or more selection screens, as illustrated for example by FIGS. 3-7. In certain embodiments, data associated with the plurality of acoustic arrangements is stored in one or more databases in memory devices of the operator computer system 180 in the fleet network 160.

The method 800 can also include that, at step 830, in response to at least an act of selecting one of the plurality of acoustic arrangements, transmitting via a telematics network one or more acoustic parameters. For example, as described with reference to FIGS. 1-7, the operator network 160 can transmit the respective acoustic package(s) including one or more modified acoustic parameters to one or more respective telematics system(s) 112 via the telematics network 140.

The method 800 also includes receiving the transmitted acoustic parameters with respective telematics systems of the selected one or more utility vehicles 110 of the plurality, or fleet, of utility vehicles, at 840. For example, as described with reference to FIGS. 1-7, the acoustic package(s) can be received with one or more respective telematics system(s) 112 in the telematics network 140, and then subsequently sent to the controller(s) 114 of the utility vehicle(s) 110.

The method 800 can also include applying the one or more of the transmitted acoustic parameters with the respective acoustic control systems of the one or more utility vehicles 110 of the plurality, or fleet, of utility vehicles, at 850. For example, as described with reference to FIGS. 1-7, the transmitted acoustic parameters are applied with the controller(s) 114 to control one or more acoustic categories of the utility vehicle(s) 110.

Aspects of the present disclosure can be incorporated in a system, a method, and/or a computer program product. The computer program product can include a computer-readable storage medium (or media) having computer-readable program instructions thereon for causing a processor to carry out aspects of the present disclosure. The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and procedural programming languages, such as the "C" programming language or similar programming languages. The computer-readable program instructions can execute entirely on the operator's computer, partly on the operator's computer, as a stand-alone software package, partly on the operator's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions can be provided to a processor of a general purpose computer, a special purpose computer, or other programmable data processing apparatus to produce a machine, such that the instructions, which execute via the processor of the computer or other programmable data processing apparatus. The machine is an example of means for implementing the functions/acts specified in the flowchart and/or block diagrams. The computer-readable program instructions can also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the functions/acts specified in the flowchart and/or block diagrams.

The computer-readable program instructions can also be loaded onto a computer, other programmable data processing apparatus, or other device to cause a series of operational steps to be performed on the computer, other programmable apparatus or other device to perform a computer implemented process, such that the instructions which execute on the computer, other programmable apparatus, or other device implement the functions/acts specified in the flowchart and/or block diagrams.

The flowchart and block diagrams in the figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in a block in a diagram can occur out of the order noted in the figures. For example, two blocks shown in succession can be executed substantially concurrently, or the blocks can sometimes be executed in the reverse order, depending upon the functionality involved. It will also be noted that each block of the block diagrams and/or flowcharts, and combinations of blocks in the block diagrams and/or flowcharts, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to explain the principles of the embodiments, the practical application or technical improvement over technologies found in the marketplace, or to enable others of ordinary skill in the art to understand the embodiments disclosed herein.

Those skilled in the art can make numerous uses and modifications of and departures from the apparatus and techniques disclosed herein without departing from the described concepts. For example, components or features illustrated or described in the present disclosure are not limited to the illustrated or described locations, settings, or contexts. Examples of apparatuses in accordance with the present disclosure can include all, fewer, or different components than those described with reference to one or more of the preceding figures. The present disclosure is therefore not to be limited to specific implementations described herein, but rather is to be accorded the broadest scope possible consistent with the appended claims, and equivalents thereof.

It should be understood that while the use of words such as preferable, preferably, preferred or more preferred utilized in the description above indicate that the feature so described may be more desirable, it nonetheless may not be necessary and embodiments lacking the same can be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A method comprising:
   selecting an acoustic arrangement that specifies one or more acoustic parameters for one or more acoustic categories, the one or more acoustic parameters including a geo-fencing setting responsive to a proximity of the vehicle to another vehicle, the acoustic parameters of the selected acoustic arrangement being implementable by an acoustic control system of a vehicle;
   transmitting, via a telematics network, the one or more acoustic parameters of the selected acoustic arrangement to the acoustic control system;
   receiving, by the acoustic control system, the transmitted one or more acoustic parameters;
   applying, by the acoustic control system, the received one or more acoustic parameters to control one or more characteristics of an audio for the one or more acoustic categories that is emitted from one or more speakers of the vehicle; and
   regulating volume of the audio based on the proximity of the vehicle to another vehicle, wherein the regulating includes initiating a change in intensity of volume of the audio when the vehicle enters within a geo-fencing proximity to the another vehicle.

2. The method of claim 1, wherein the one or more acoustic parameters include at least a volume range setting.

3. The method of claim 2, wherein the volume range setting is different for at least two of the one or more acoustic categories.

4. The method of claim 3, wherein the vehicle comprises one or more golf cars of a plurality of golf cars, each of the plurality of golf cars having an acoustic control system.

5. The method of claim 4, further including the step of selecting one or more golf cars of the plurality of golf cars that are to receive, via the transmitting and receiving steps, the one or more acoustic parameters of the selected acoustic arrangement.

6. The method of claim 1, wherein the step of selecting the acoustic arrangement comprises selecting one of a plurality of acoustic arrangements, each of the plurality of acoustic arrangements having one or more acoustic parameters, and wherein the acoustic parameters of the selected acoustic arrangement is different than the acoustic parameters of at least another one of the plurality of acoustic arrangements.

7. The method of claim 1, wherein the one or more acoustic categories comprises at least one of the following: streaming music, streaming video, social media, audiobooks, podcasts, and operator announcements.

8. The method of claim 1, wherein the selected acoustic arrangement further includes at least one acoustic configuration, the at least one acoustic configuration having one or more acoustic parameters that are configured to adjust the applied one or more acoustic parameters of the one or more acoustic categories.

9. The method of claim 8, wherein the one or more acoustic parameters of the at least one acoustic configuration includes at least a volume setting, and further wherein the at least one acoustic configuration includes one or more of the following: a fleet-timed audio, a fleet master volume, and a fleet volume mute.

10. A non-transitory computer-readable storage medium storing a plurality of acoustic arrangements, each of the plurality of acoustic arrangements specifying at least one acoustic parameter implementable by respective acoustic control systems of one or more of a plurality of vehicles to control one or more acoustic categories, the non-transitory computer-readable storage medium comprising instructions that, when executed by a processor, cause the processor to perform operations including:
    selecting an acoustic arrangement from the plurality of acoustic arrangements;
    identifying one or more vehicles of the plurality of vehicles to receive the at least one acoustic parameter of the selected acoustic arrangement, wherein the at least one acoustic parameter includes a geo-fencing related to a proximity of the one or more vehicles to at least one other vehicle of the plurality of golf cars such that the acoustic parameter is operative to limit an intensity of an audio volume of the at least one other vehicle when the at least one other vehicle enters within a geo-fencing proximity to the another vehicle;
    generating an acoustic package operable to update one or more non-transitory computer-readable memory media of respective acoustic control systems of the identified one or more of vehicles with the at least one acoustic parameter of the selected acoustic arrangement; and
    transmitting the acoustic package to the identified one or more of vehicles, the transmission being completed upon receipt by the respective acoustic control systems of the identified one or more vehicles with the at least one acoustic parameter of the selected acoustic arrangement.

11. The non-transitory computer-readable storage medium of claim 10, wherein the at least one acoustic parameter includes a volume range setting for the one or more acoustic categories, and further wherein the volume range setting is different for at least two of the one or more acoustic categories.

12. The non-transitory computer-readable storage medium of claim 11, wherein the plurality of vehicles comprises a plurality of golf cars.

13. The non-transitory computer-readable storage medium of claim 12, wherein the step of identifying one or more vehicles is based, at least in part, on at least one of the following: a geographic location of the one or more vehicles, a time of day, and a date.

14. The non-transitory computer-readable storage medium of claim 10, wherein the plurality of acoustic arrangements includes acoustic arrangements based on one or more of: a fleet-timed volume audio, a fleet master volume, a fleet volume mute, streaming music, streaming video, social media, audiobooks, podcasts, and operator announcements.

15. The non-transitory computer-readable storage medium of claim 10, wherein the plurality of acoustic arrangements are predetermined acoustic arrangements.

16. The non-transitory computer-readable storage medium of claim 10, wherein the at least one acoustic parameter includes one or more of the following: a volume setting of fleet-timed audio, a volume setting fleet master volume, a volume setting of fleet volume mute, a volume setting of geo-fencing, a volume setting of streaming music, a volume setting of streaming video, a volume setting of social media, a volume setting of audiobooks, a volume setting of podcasts, or a volume setting of operator announcements.

17. The non-transitory computer-readable storage medium of claim 10, wherein the one or more acoustic categories include: streaming video, streaming music, social media, audiobooks, podcasts, announcements.

18. An auditory optimization system comprising:
a first computer system comprising:
    a non-transitory computer-readable storage medium storing a plurality of acoustic arrangements specifying a plurality of acoustic parameters implementable by respective acoustic control systems of one or more vehicles to control one or more characteristics of an audio for one or more acoustic categories that is emitted from one or more speakers of the vehicle;
    at least one processor; and
    program code stored on the non-transitory computer-readable storage medium and configured upon execution by the at least one processor to select one of the plurality of acoustic arrangements and an identify the vehicle to receive one or more acoustic parameters of the selected acoustic arrangement; generate, in response to the selected acoustic arrangement and the identification of the vehicle, an acoustic package operable to update one or more non-transitory computer-readable storage media of the acoustic control system of the identified vehicle with at least some of the one or more acoustic parameters of the selected acoustic arrangement, the one or more acoustic parameters including a geo-fencing setting structured to control a volume of the acoustic control systems of the one or more vehicles based on position of another vehicle such that the geo-fencing setting is operative to facilitate a change in intensity of an audio volume of the one or more vehicles when the another vehicle enters within a geo-fencing proximity to the one or more vehicles; and transmit the acoustic package to the identified vehicle.

19. The auditory optimization system of claim 18, wherein the identified vehicle is one or more golf cars of a plurality of golf cars.

20. The auditory optimization system of claim 19, further comprising a second computer system, wherein the second computer system is configured to provide the selected acoustic arrangement and identify the vehicle via a remotely accessible web portal maintained by the first computer system.

* * * * *